United States Patent [19]

Thompson et al.

[11] 4,120,479

[45] Oct. 17, 1978

[54] RISING STEM VALVE ACTUATOR

[75] Inventors: Richard L. Thompson; Murray J. Hubbert; Vernon J. Wade, all of Houston, Tex.

[73] Assignee: Bettis Corporation, Houston, Tex.

[21] Appl. No.: 787,882

[22] Filed: Apr. 15, 1977

[51] Int. Cl.² ............................................. F16K 31/124
[52] U.S. Cl. ........................................ 251/56; 251/58; 251/229; 251/252; 92/31; 74/57
[58] Field of Search ................ 74/57, 89.15; 92/31 X; 251/56, 58, 229, 251, 252

[56] References Cited

U.S. PATENT DOCUMENTS

| | | | |
|---|---|---|---|
| 2,883,144 | 4/1959 | Kendig | 251/58 |
| 2,953,344 | 9/1960 | Yancey | 251/58 |
| 2,998,805 | 9/1961 | Usab | 251/58 |
| 3,046,802 | 7/1962 | Cupedo | 251/252 |
| 3,078,065 | 2/1963 | Vickery | 251/58 |
| 3,184,214 | 5/1965 | King | 251/252 |
| 3,207,468 | 9/1965 | Lauducci et al. | 251/58 |
| 3,417,960 | 12/1968 | Stehlin | 251/58 |
| 3,450,382 | 6/1969 | Calim | 251/58 |
| 3,492,880 | 2/1970 | Pearson | 251/58 |

Primary Examiner—Martin P. Schwadron
Assistant Examiner—G. L. Walton
Attorney, Agent, or Firm—Robert W. B. Dickerson

[57] ABSTRACT

Valve actuator for causing both rotation of a valve member and linear movement of said valve member.

1 Claim, 4 Drawing Figures

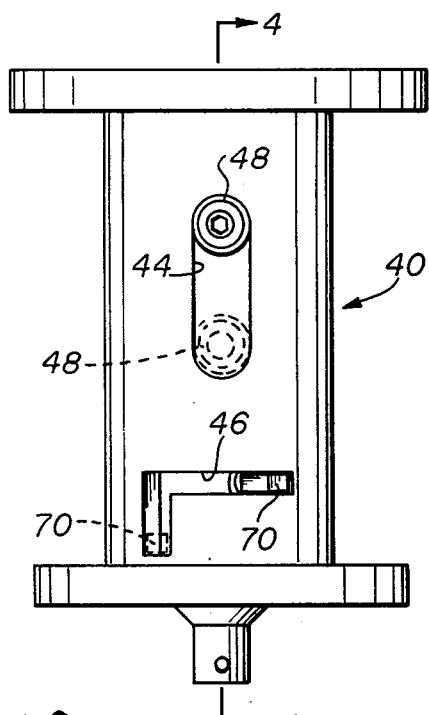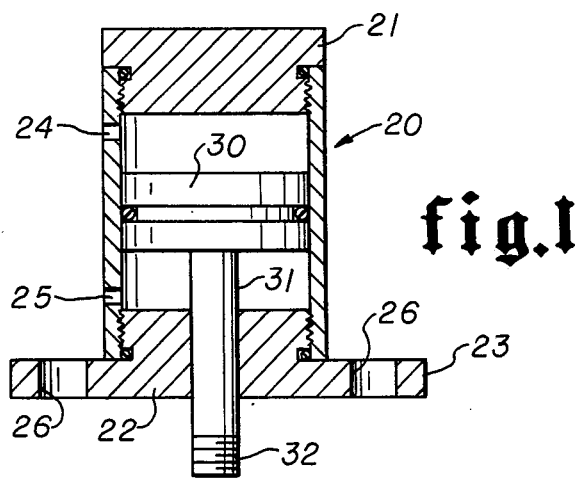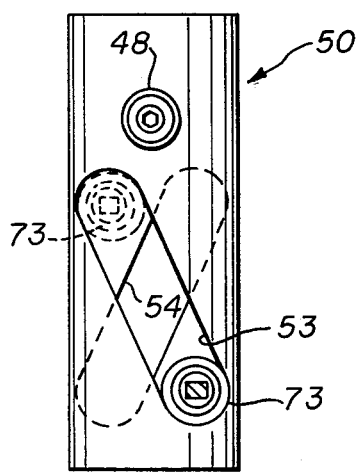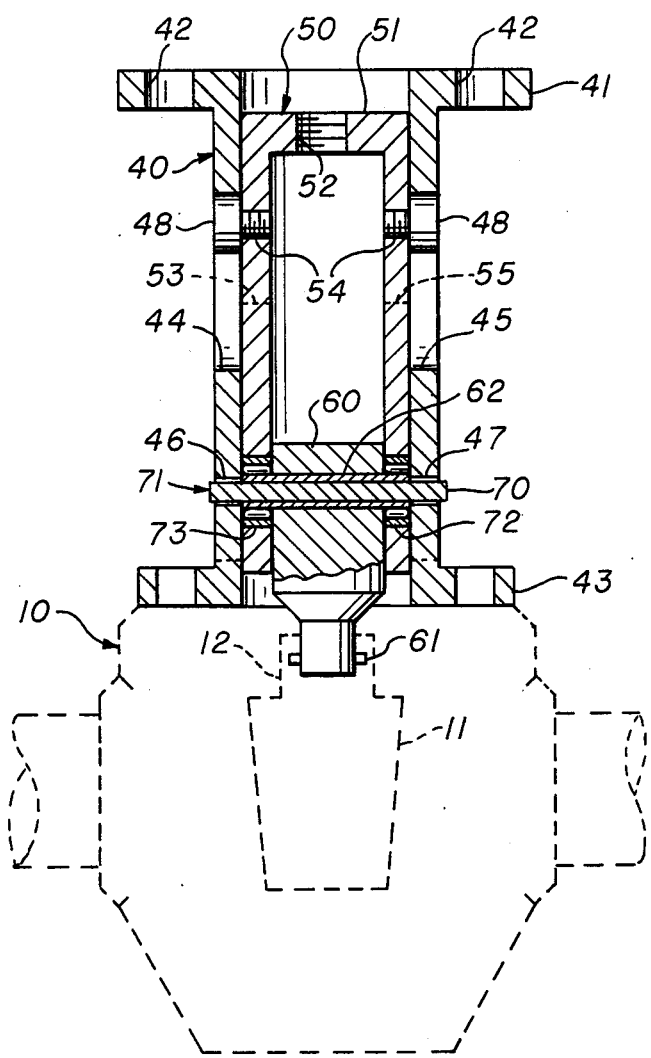

4,120,479

RISING STEM VALVE ACTUATOR

BACKGROUND OF THE INVENTION

Actuators have long been used to control the opening and closing of valves. One such type valve must be rotated approximately 90° between an open and closed position. Many actuators effectively translate linear piston movement into rotational movement of a valve-stem-actuating member. As a variant, some rotatable valves must first have their stem moved linearly. It is to control the operation of such valves that applicants' invention is directed.

SUMMARY OF THE INVENTION

A double acting cylinder includes a piston, with rod attached thereto. Such rod is further attached to a reciprocable input sleeve. The input sleeve, thereby, is caused to reciprocate within a further sleeve. Each sleeve is slotted, and a pin extends transversely of the sleeves, through the slots. By virtue of the relationship of the slots, the aformentioned pin is caused to both move linearly and to rotate, about the actuator's axis. Inasmuch as said pin is fixed to an output shaft, and it to a controlled valve, the desired operation is achieved.

DESCRIPTION OF THE DRAWINGS

FIG. 1 is a vertical section through the power cylinder;

FIG. 2 is an elevation of the mounting sleeve;

FIG. 3 is an elevation of the input sleeve; and

FIG. 4 is a vertical section taken along lines 4—4 of FIG. 2.

DESCRIPTION OF A PREFERRED EMBODIMENT

In FIG. 4, a generalized valve housing 10 is illustrated, having therein a valve member 11 with stem 12 attached. In the type valve of concern, the valve member must rise some distance prior to rotating 90° from a closed to an open or fluid passing position.

Consider now cylinder 20 of FIG. 1. Such cylinder may be closed at one end by cylinder head 21, and at the other by head 22. The latter mentioned head includes mounting flange 23. Slidably positioned within cylinder 10 is piston 30, having rod 31 depending therefrom. Head 22 slidably and sealingly accomodates piston rod 31. Fluid from an outside source (not shown) may be provided and removed from cylinder 20, on either side of piston 30, through passageways 24, 25, forming a double acting linear cylinder. The end of rod 31 includes engagement means, such as male threads 32, for a purpose hereafter described.

Flange 23 of cylinder 20 is adapted to be fixed to flange 41 of mounting sleeve 40 by the insertion of bolts (not shown) through bolt holes 26, 42. At the opposite end of the mounting sleeve is a further flange 43, adapted to permit mounting on valve housing 10. Oppositely positioned, elliptical cutouts 44, 45, extend through the walls of horizontally disposed, L-shaped slots, 46, 47, extend through the walls of mounting sleeve 40. In the case of each slot, looking inwardly from outside the sleeve, the longer leg thereof extends in the same direction from the shorter leg, i.e., clockwise or counterclockwise.

Slidably positioned within the interior of mounting sleeve 40, is input sleeve 50. At one end of sleeve 50, head 51 has means for receiving engagement means 32 of piston rod 31. Such receiving means are shown as female threads 52. The side walls of input sleeve 50, near head 51, include a pair of oppositely disposed, threaded taps 54, for receiving the threaded shanks of a pair of roller assemblies 48. These roller assemblies are fixed to input sleeve 50, and roll vertically as depicted, within and are confined by cutouts 44, 45 of mounting sleeve 40, to prevent relative rotation between sleeves 40 and 50. Opposite sleeve head 51, a pair of angularly disposed slots 53, 55, extend through the walls of input sleeve 50. Again, looking inwardly from outside sleeve 50, each of such slots continues in the same direction from one extremity to the other, i.e., clockwise or counterclockwise. Adjacent slots 53, 55, an output shaft 60 is movably positioned at least partially within input sleeve, with valve stem engaging lug 61 adapted to be fixed to valve stem 12 in any convenient means. Fitted, as by pressing for example, within passage way 62 through output shaft 60 is a roller assembly 71 having oppositely positioned rollers, 72, 73, which rollers ride within input sleeve slots 53, 55. Fitted within assembly 71 is cross pin 70, whose opposite ends extend through slots 46, 47 in mounting sleeve 40.

In operation, sleeve 40 would be mounted on a valve housing such as 10. Piston rod 31 would be engaged with input sleeve 50, such as by threads 32, 52. Assume that valve 11 is in open or up position, and it is desired to close the valve. Fluid pressure from the outside source, not shown, would be caused to enter cylinder 20 through port 24, above piston 30, moving such piston downwardly, and exhausting fluid through port 25 to a reservoir, also not shown. Such piston movement would move input sleeve 50 downwardly from the solid line position of FIG. 4, moving rollers 48 within slots 44, 45 of sleeve 40, angularly move slide rollers 72, 73 within slots 53, 55 in sleeve 50, and rotate pin 70 within slots 46, 47 of sleeve 40, and thereby rotate output sleeve 60 along with valve stem 12 and valve member 11, until pin 70 enters adjacent the short leg of L-shaped slots 46, 47. Thereafter, further downward movement of piston 30 would move pin 70 downwardly in such short leg, and set the valve member in its closed position. Opening the valve is caused by the reverse of the above described series of events. Pressure entering cylinder 20 through port 25 moves piston 30 upwardly. Initial upwardly movement of attached sleeve 50 unseats valve member 11, moves pin 70 upwardly to the long leg of slots 46, 47, and further upwardly piston movement horizontally moves pin 70 within slots 46, 47, and by virtue of rollers 72, 73 within angled slots 53, 54, rotates valve member 11 by approximately 90° to an open position.

Although only a single embodiment has been described it should be obvious that numerous modifications would be possible by one skilled in the art without departing from the spirit of the invention, the scope of which is intended to be limited only by the following claims.

We claim:

1. A valve actuator comprising:
   a cylinder carrying a 2-way piston and piston rod depending from said piston rod having means at one end thereof for attachment to an input sleeve;
   a mounting sleeve adapted to be fixed both to said cylinder and to a valve, said mounting sleeve having a first opposed pairs of slots of L-shaped configuration and a second opposed pair of axially oriented slots;

an input sleeve, adapted to be attached to said piston rod, movably positioned within said mounting sleeve, said input sleeve carrying opposed rollers for preventing, in combination with said axially oriented slots, relative rotation of said sleeves, said input sleeve also having an opposed pair of arcuately configured slots; and an output member carrying a pin, the opposed ends of said pin extending through both said pair of arcuately configured slots of said input sleeve as well as through said pair of L-shaped slots in said mounting sleeve and said output member also having means adapted to fix said output member to a valve.

* * * * *